(12) United States Patent
Yamamoto et al.

(10) Patent No.: US 12,277,863 B2
(45) Date of Patent: Apr. 15, 2025

(54) INFORMATION PROCESSING APPARATUS, INFORMATION PROCESSING METHOD, PROGRAM, AND INFORMATION PROCESSING SYSTEM

(71) Applicant: Sony Group Corporation, Tokyo (JP)

(72) Inventors: Shohei Yamamoto, Tokyo (JP); Kenta Kawamoto, Tokyo (JP); Takayoshi Takayanagi, Tokyo (JP); Kohei Urushido, Tokyo (JP); Shun Lee, Tokyo (JP); Kazumi Aoyama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 349 days.

(21) Appl. No.: 17/791,537

(22) PCT Filed: Dec. 28, 2020

(86) PCT No.: PCT/JP2020/049112
§ 371 (c)(1),
(2) Date: Jul. 8, 2022

(87) PCT Pub. No.: WO2021/145215
PCT Pub. Date: Jul. 22, 2021

(65) Prior Publication Data
US 2023/0035476 A1 Feb. 2, 2023

(30) Foreign Application Priority Data
Jan. 15, 2020 (JP) .................. 2020-004320

(51) Int. Cl.
G08G 5/00 (2006.01)
(52) U.S. Cl.
CPC ......... *G08G 5/0034* (2013.01); *G08G 5/0013* (2013.01); *G08G 5/0026* (2013.01);
(Continued)

(58) Field of Classification Search
CPC .... G08G 5/0034; G08G 5/006; G08G 5/0013; G08G 5/0026; G08G 5/0078;
(Continued)

(56) References Cited

U.S. PATENT DOCUMENTS 6,161,063 A * 12/2000 Deker .................. G05D 1/0615
701/4
8,082,102 B2 * 12/2011 Ravenscroft ......... G08G 5/0069
701/2
(Continued)

FOREIGN PATENT DOCUMENTS

JP 2016-102668 A 6/2016
JP 2016-181109 A 10/2016
(Continued)

OTHER PUBLICATIONS

International Search Report and Written Opinion mailed on Mar. 2, 2021, received for PCT Application PCT/JP2020/049112, filed on Dec. 28, 2020, 9 pages including English Translation.

*Primary Examiner* — Mussa A Shaawat
(74) *Attorney, Agent, or Firm* — XSENSUS LLP

(57) ABSTRACT

The present disclosure relates to an information processing apparatus, an information processing method, a program, and an information processing system capable of more easily realizing route planning.

A route planning unit selects, on the basis of priority information regarding setting of the moving route, a viaport where a moving object stops over from among a plurality of charging ports that charges the moving object, and sets a moving route of a moving object from a departure point to a destination. The technology according to the present disclosure can be applied to, for example, an information processing apparatus that performs automatic piloting of a drone.

16 Claims, 13 Drawing Sheets

(52) U.S. Cl.
CPC ........... *G08G 5/006* (2013.01); *G08G 5/0069* (2013.01); *G08G 5/0078* (2013.01); *G08G 5/0091* (2013.01)

(58) Field of Classification Search
CPC .... G08G 5/0091; G08G 5/0069; G01C 21/34; G06Q 50/10
See application file for complete search history.

(56) References Cited

U.S. PATENT DOCUMENTS

| | | | |
|---|---|---|---|
| 9,262,929 B1* | 2/2016 | Roy | G08G 5/006 |
| 2005/0195096 A1* | 9/2005 | Ward | G01C 21/005 |
| | | | 340/995.14 |
| 2008/0183344 A1* | 7/2008 | Doyen | G08G 5/0082 |
| | | | 701/9 |
| 2010/0094485 A1* | 4/2010 | Verlut | G01C 21/005 |
| | | | 701/3 |
| 2014/0018979 A1* | 1/2014 | Goossen | G08G 5/0034 |
| | | | 701/3 |
| 2017/0090484 A1* | 3/2017 | Obaidi | G06Q 30/0185 |
| 2017/0267343 A1* | 9/2017 | Chen | G06Q 10/08355 |
| 2018/0061251 A1* | 3/2018 | Venkatraman | B64U 10/13 |
| 2019/0114564 A1* | 4/2019 | Ferguson | G06Q 10/06315 |
| 2019/0126769 A1* | 5/2019 | Schmalzried | G08G 5/0069 |
| 2019/0197643 A1* | 6/2019 | Cochran | G06Q 10/06393 |
| 2019/0204856 A1* | 7/2019 | Weng | G08G 7/00 |

FOREIGN PATENT DOCUMENTS

| | | |
|---|---|---|
| JP | 6475899 B1 | 2/2019 |
| JP | 2019-113467 A | 7/2019 |
| JP | 2019-121405 A | 7/2019 |
| WO | 2017/208754 A1 | 12/2017 |

\* cited by examiner

INFORMATION PROCESSING APPARATUS, INFORMATION PROCESSING METHOD, PROGRAM, AND INFORMATION PROCESSING SYSTEM

CROSS-REFERENCE TO RELATED APPLICATIONS

The present application is based on PCT filing PCT/JP2020/049112, filed Dec. 28, 2020, which claims priority to JP 2020-004320, filed Jan. 15, 2020, the entire contents of each are incorporated herein by reference.

TECHNICAL FIELD

The present disclosure relates to an information processing apparatus, an information processing method, a program, and an information processing system, and more particularly, to an information processing apparatus, an information processing method, a program, and an information processing system capable of more easily realizing route planning.

BACKGROUND ART

A configuration for guiding a user of a moving object to a charging station to which the moving object receives power supply is known.

For example, Patent Literature 1 discloses an information providing system that searches, on the basis of a use history of power transmission apparatuses used in the past, for a charging station in which a power transmission apparatus capable of supplying power is installed.

CITATION LIST

Patent Document

Patent Document 1: Japanese Patent Application Laid-Open

SUMMARY OF THE INVENTION

Problems to be Solved by the Invention

However, in the configuration of Patent Literature 1, since it is necessary for the user to determine which charging station to use, it takes time and effort for route planning of the moving object.

The present disclosure has been made in view of such a situation, and an object thereof is to more easily realize route planning.

Solutions to Problems

An information processing apparatus according to the present disclosure includes a route planning unit that sets a moving route from a departure point to a destination of a moving object, in which the route planning unit selects, on the basis of priority information regarding setting of the moving route, a viaport where the moving object stops over in the moving route from among a plurality of charging ports that charges the moving object.

An information processing method according to the present disclosure includes, by an information processing apparatus that sets a moving route from a departure point to a destination of a moving object, selecting, on the basis of priority information regarding setting of the moving route, a viaport where the moving object stops over in the moving route from among a plurality of charging ports that charges the moving object.

A program according to the present disclosure is a program for causing a computer to execute selecting, on the basis of priority information regarding setting of a moving route from a departure point to a destination of a moving object, a viaport where the moving object stops over in the moving route from among a plurality of charging ports that charges the moving object.

An information processing system according to the present disclosure includes an information processing apparatus that sets a moving route of a moving object from a departure point to a destination, and a plurality of charging ports that charges the moving object, in which the information processing apparatus selects, on the basis of priority information regarding setting of the moving route, a viaport where the moving object steps over in the moving route from among the plurality of charging ports.

In the present disclosure, on the basis of priority information regarding setting of a moving route from a departure point to a destination of a moving object, a viaport where the moving object stops over in the moving route from among a plurality of charging ports that charges the moving object is selected.

BRIEF DESCRIPTION OF DRAWINGS

FIG. 3 is a diagram for explaining selection of a viaport.

MODE FOR CARRYING OUT THE INVENTION

Hereinafter, modes for carrying out the present disclosure (hereinafter, it is referred to as an embodiment) will be described. Note that the description is given in the following order.

1. Outline of technology according to present disclosure and system configuration
2. UTM configuration
3. Process of route planning processing
4. Specific example of viaport selection
5. Configuration example of computer

<1. Outline of Technology According to Present Disclosure and System Configuration>

(Outline of Technology According to Present Disclosure)

Figure 1:
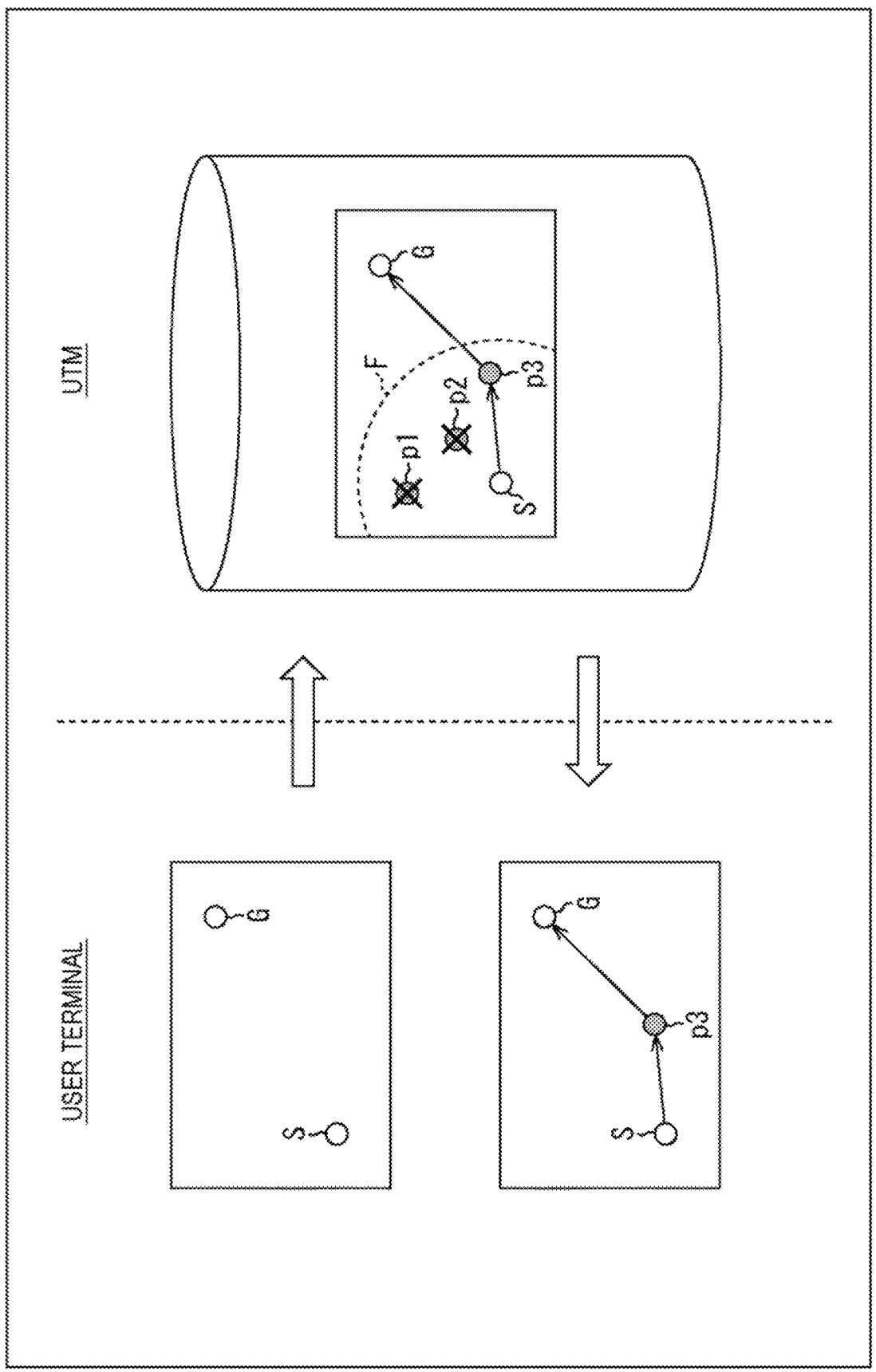
FIG. 1 is a diagram illustrating an outline of a technology according to the present disclosure.

FIG. 1 is a diagram illustrating an outline of a technology according to the present disclosure. In the technology according to the present disclosure. Unmanned Aerial System Traffic Management (UTM) manages a flight of a drone, which is one of flight vehicles, on the basis of information transmitted from a user terminal operated by a user, thereby automatically piloting the drone.

First, before the drone flies, user input information such as a departure point S and a destination G input by the user is transmitted from the user terminal to the UTM. The user input information also includes aircraft information such as a manufacturer and a model number of the drone, and a remaining battery level.

The UTM sets, on the basis of the user input information from the user terminal, a flight route from the departure point S to the destination G including the charging port where the drone stops over.

In the example of FIG. 1, the charging port p3 among the charging ports p1, p2, and p3 installed in a reachable range F being reachable from the departure point S is selected as the charging port (hereinafter, also referred to as a viaport) where the drone stops over. The UTM sets a flight route including the charging port p3 and sends the flight route to the user terminal. At this time, the UTM transmits a reservation application to the charging port p3. In this way, the drone can fly via the charging port p3.

On the other hand, in a case where the setting of the flight route fails, such as a case where the charging port p3 to be stopped over cannot be reserved, the UTM does not permit departure of the drone.

(System Configuration)

Figure 2:
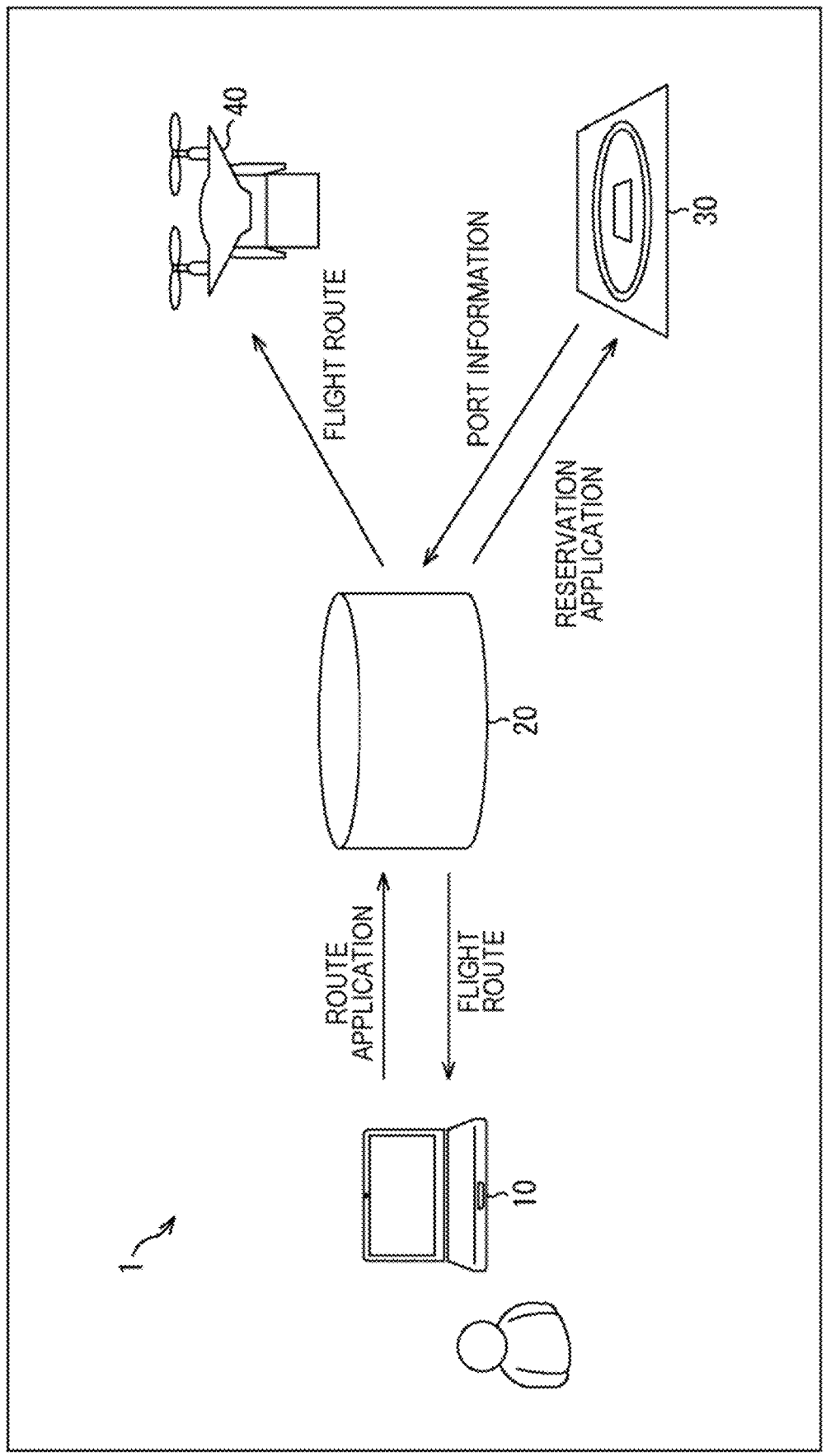
FIG. 2 is a diagram illustrating a configuration example of an information processing system to which the technology according to the present disclosure is applied.

FIG. 2 is a diagram illustrating a configuration example of an information processing system to which the technology according to the present disclosure is applied.

The information processing system 1 in FIG. 2 includes a user terminal 10, a UTM 20, a charging port 30, and a drone 40. Although only one charging port 30 is depicted in the example of FIG. 2, it is assumed that a plurality of charging ports 30 is installed in actual practice.

The user terminal 10 includes a personal computer (PC) operated by the user, a tablet terminal, a smartphone, or the like, transmits user input information input by the user to the UTM 20, and outputs information transmitted from the UTM 20 as an image or a sound.

If a route application for applying for setting of a flight route of the drone 40 is made as user input information from the user terminal 10, the UTM 20 acquires port information from the plurality of charging ports 30. The UTM 20 selects, on the basis of the acquired port information, a viaport where the drone 40 stops over in the flight route from among the plurality of charging ports 30, and applies for a reservation for the viaport. In this way, the UTM 20 sets the flight route of the drone 40.

In a case where the flight route is successfully set, the UTM 20 transmits the flight route to the user terminal 10 or the drone 40. On the other hand, in a case where the setting of the flight route fails, the UTM 20 transmits an error notification indicating that the flight route cannot be set to the user terminal 10 or the drone 40.

<2. UTM Configuration>

Next, a specific configuration of the UTM 20 will be described.

Figure 3:
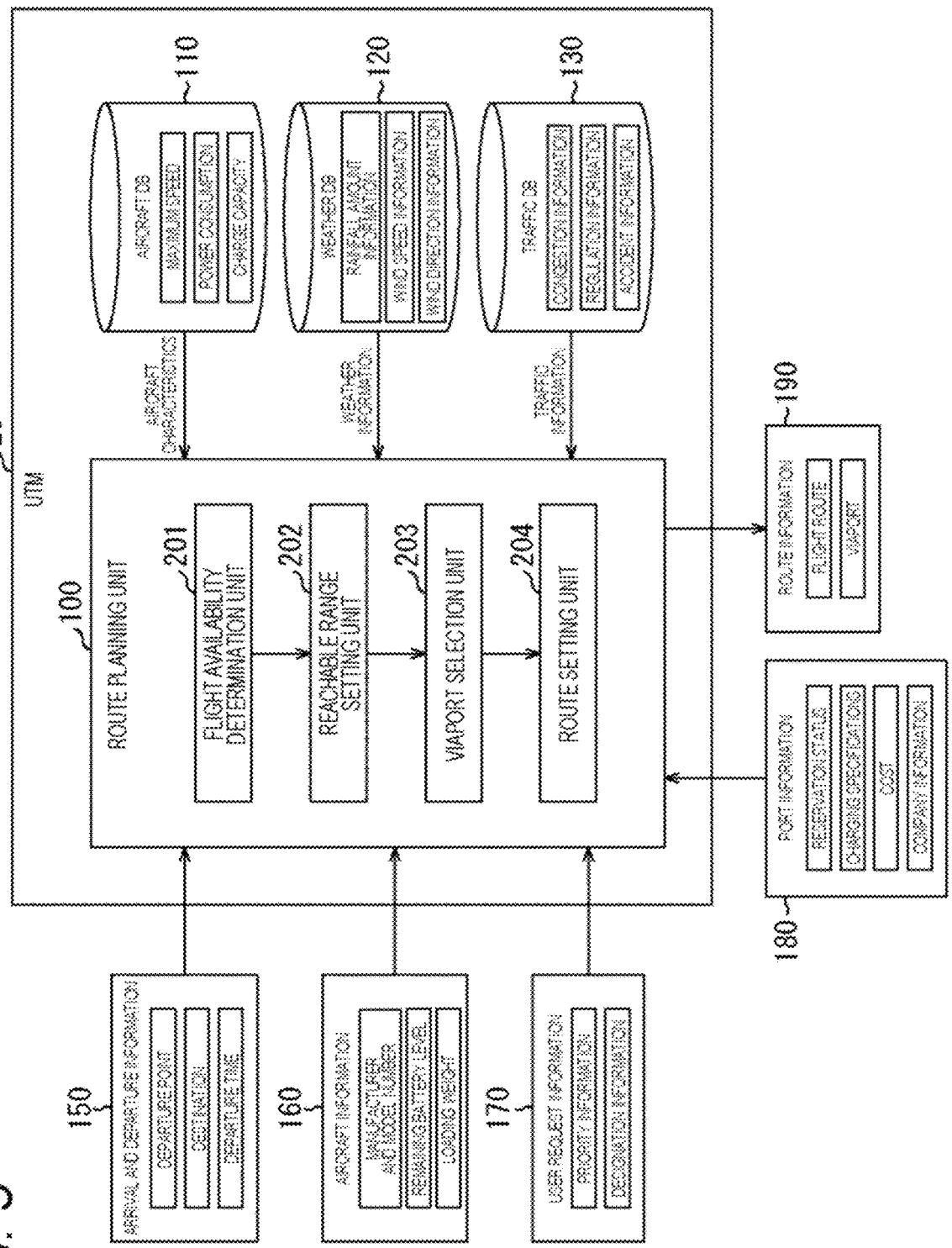
FIG. 3 is a block diagram illustrating a functional configuration example of UTM.

FIG. 3 is a block diagram illustrating a functional configuration example of the UTM 20 as an information apparatus to which the technology according to the present disclosure is applied.

The UTM 20 includes a route planning unit 100, an aircraft, database (DB) 110, a weather DB 120, and a traffic DB 130.

The aircraft DB 110 holds the maximum speed, the power consumption, the charge capacity of the battery, and the like for each manufacturer and model number as the aircraft characteristics of the drone 40. The weather DB 120 holds rainfall amount information, wind speed information, wind direction information, and the like as weather information. The traffic DB 130 holds congestion information, regulation information, accident information, and the like as traffic information. The weather information held in the weather DB 120 and the traffic information held in the traffic DB 130 are updated at predetermined time intervals, for example.

The route planning unit 100 is supplied with arrival and departure information 150, aircraft information 160, and user request information 170 as user input information from the user terminal 10.

The arrival and departure information 150 includes coordinates (position information) indicating a departure point and a destination of the drone 40, a departure time, and the like. The aircraft information 160 includes a manufacturer and a model number, a remaining battery level, a loading weight, and the like, of the drone 40. The user request information 170 includes priority information related to setting of a flight route, designation information for designating a company of a charging port, and the like. Details of the priority information will be described later.

The port information 180 from the charging port 30 is also supplied to the route planning unit 100.

The port information 180 includes a reservation status of each charging port 30, charging specifications such as a rated output, a cost for charging per unit time, company information representing a company that owns the charging port 30, and the like.

The route planning unit 100 sets a moving route from the departure point, to the destination of the drone 40. The route planning unit 100 includes a flight availability determination unit 201, a reachable range setting unit 202, a viaport selection unit 203, and a route setting unit 204.

On the basis of the weather information from the weather DR 120 and the traffic information from the traffic DB 130, the flight availability determination unit 201 determines whether or not a flight route from a departure point to a destination included in the arrival and departure information 150 can be set under the present status.

The reachable range setting unit 202 sets the reachable range from the predetermined position of the drone 40 on the basis of the aircraft characteristics from the aircraft DB 110 and the aircraft information 160 input as the user input information.

The viaport selection unit 203 selects a viaport where the drone 40 stops over from among the charging ports 30 installed in the reachable range.

The route setting unit 204 sets a flight route of the drone 40 on the basis of the selected viaport. The route setting unit 204 transmits route information including information indicating the set flight route, the selected viaport, and the like to the user terminal 10 and the drone 40.

<3. Process of Route Planning Processing>

Figure 4:
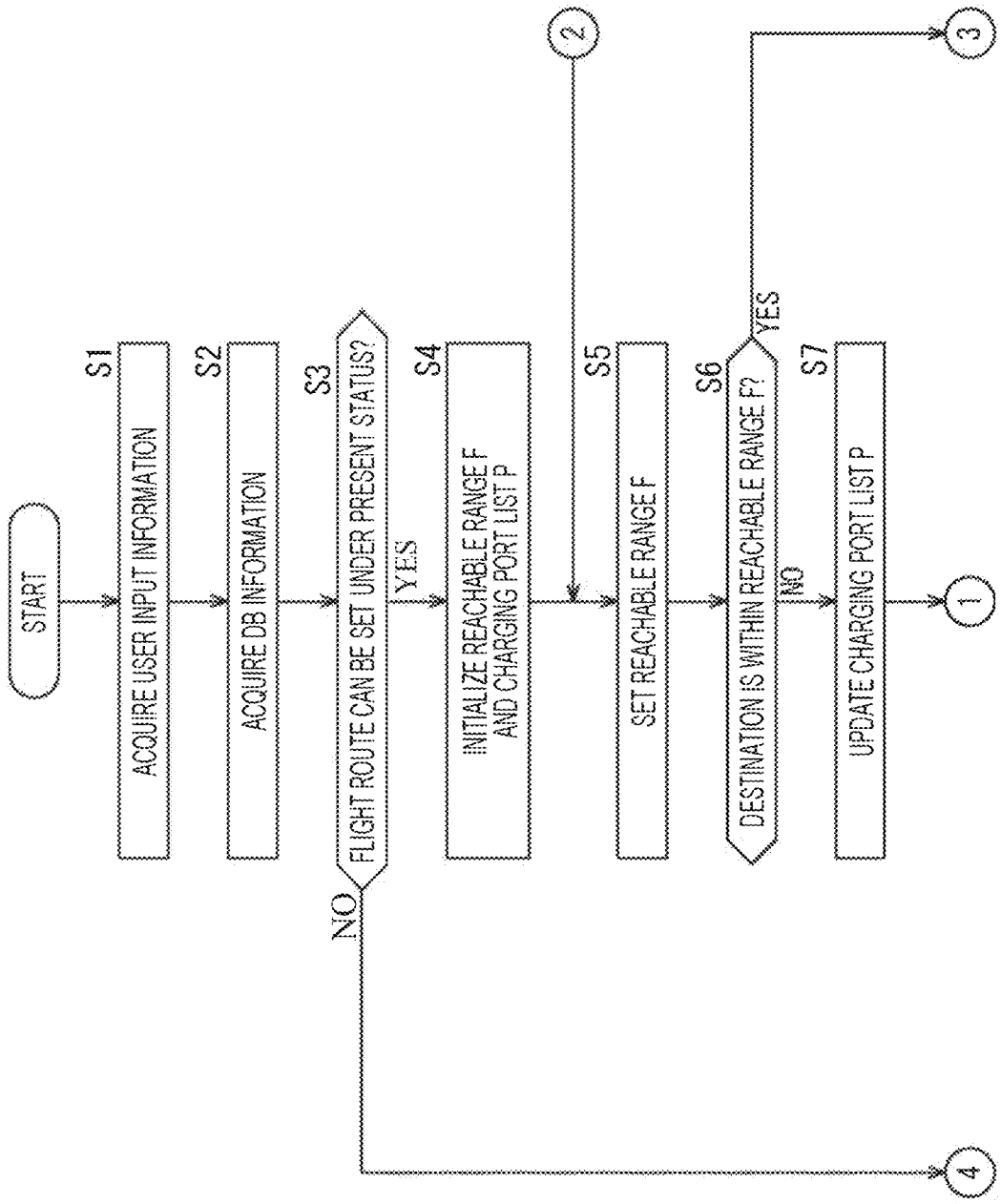
FIG. 4 is a flowchart for explaining a process of route planning processing.
Figure 5:
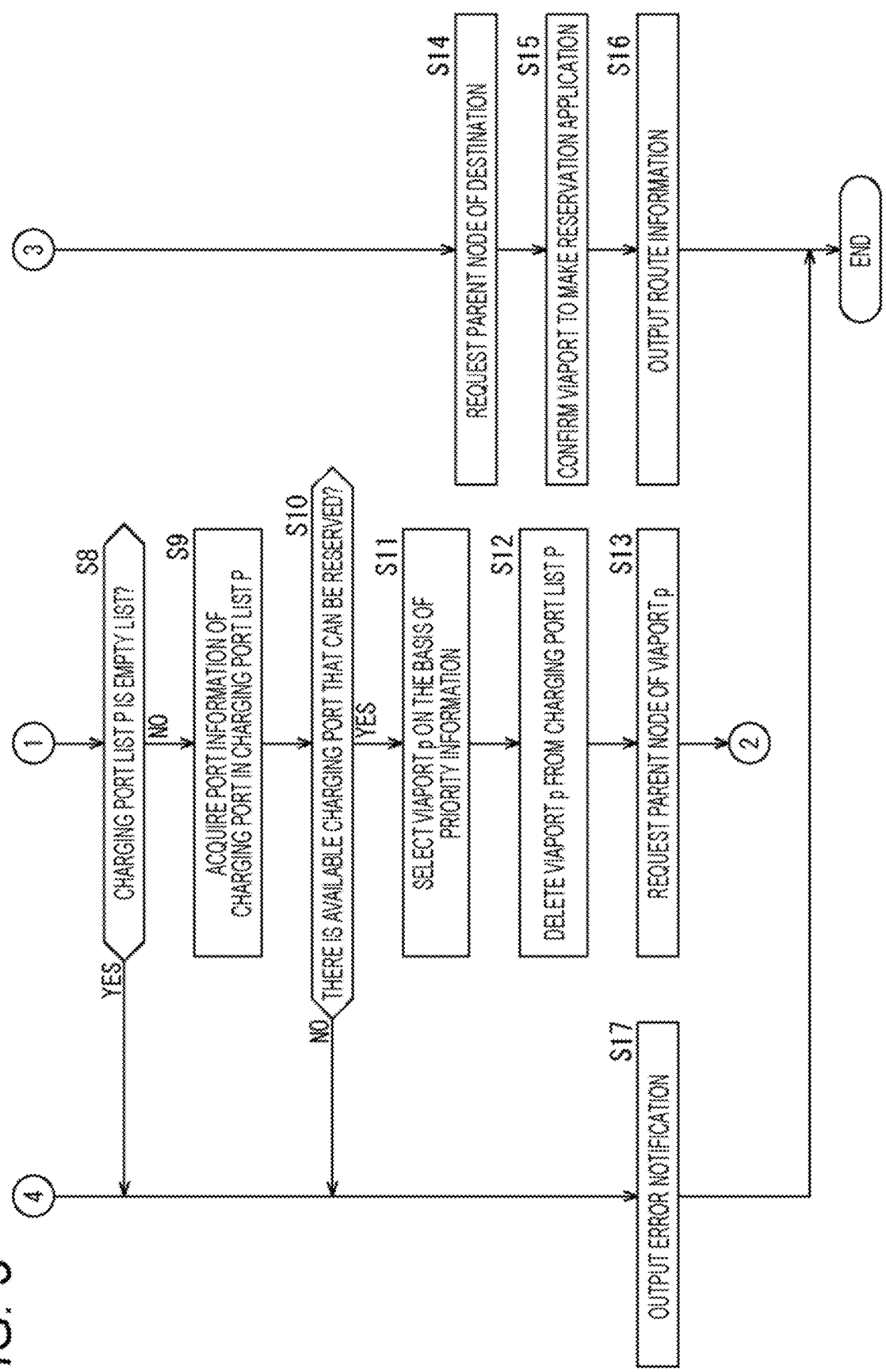
FIG. 5 is a flowchart for explaining a process of route planning processing.

Next, a process of a route planning processing of the drone 40 by the UTM 20 will be described with reference to flowcharts in FIGS. 4 and 5. The processing in FIGS. 4 and 5 is executed before flight of the drone 40.

In step S1, the route planning unit 100 acquires the arrival and departure information 150, the aircraft information 160, and the user request information 170 as user input, information from the user terminal 10.

In step S2, the route planning unit 100 acquires aircraft characteristics of the drone 40, weather information, and traffic information as DB information held by the aircraft DB 110, the weather DB 120, and the traffic DB. The aircraft characteristics of the drone 40 are acquired on the basis of the aircraft information 160 acquired as the user input information.

In step S3, on the basis of the weather information and the traffic information acquired as the DB information, the flight availability determination unit 201 determines whether or not a flight route from a departure point to a destination included in the arrival and departure information 150 acquired as the user input information can be set under the present status.

In a case where the flight route is not impossible due to bad weather or the like, and the flight route is not impossible due to traffic regulations or the like, and the flight route can be set under the present status, the process proceeds to step S4.

In step 34, the reachable range setting unit 202 initializes the reachable range F of the drone 40 and a charging port list P, which is a list of the charging ports 30 installed in the reachable range F. The reachable range F and the charging port list P are set and updated on the basis of, for example, map information included in the UTM 20.

In step S5, the reachable range setting unit 202 sets the reachable range F from the predetermined position of the drone 40 on the basis of the aircraft characteristics from the aircraft DB 110 and the aircraft information 160 acquired as the user input information.

Specifically, the reachable range F from the departure point is first set on the basis of the remaining battery level of the drone 40 and the power consumption among the aircraft characteristics specified by the manufacturer and the model number. At this time, the lower the remaining battery level, the shorter the flyable distance of the drone 40, and the narrower the reachable range F.

In step S6, the reachable range setting unit 202 determines whether or not the destination is within the reachable range F.

In a case where it is determined that the destination is not within the reachable range F, the process proceeds to step S7, and the viaport selection unit 203 updates the charging port list P. At this time, charging ports 30 other than the charging port 30 held by the company designated by the designation information included in the user request information 170 may be excluded from the charging port list P.

When the charging port list P is updated, the process proceeds to step S8 in FIG. 5, and the viaport selection unit 203 determines whether or not the charging port list P is an empty list. If the charging port list P is not an empty list, that is, in a case where one or more charging ports 30 are installed within the reachable range F, the process proceeds to step S9.

In step S9, the viaport selection unit 203 acquires the port information 180 of the charging port 30 in the charging port list P.

In step S10, the viaport selection unit 203 determines, on the basis of the reservation status included in the port information 180, whether or not there is an available charging port 30 that can be reserved. In a case where it is determined that there is the available charging port 30, the process proceeds to step S11.

In step S11, the viaport selection unit 203 selects, on the basis of the priority information regarding the setting of the flight route included in the user request information 170, the viaport p from among the available charging ports 30 that are installed within the reachable range F.

The priority information is information indicating a determination criterion desired by the user as to which of the cost for charging to the destination, the required time to the destination, the distance to the destination, the flight efficiency, the safety, and the like is to be prioritized in the setting of the flight route.

Therefore, the viaport selection unit 203 selects, as the viaport p, the charging port 30 most suitable for the determination criterion represented by the priority information from among the available charging ports 30 that are installed within the reachable range F.

In step S12, the viaport selection unit 203 deletes the selected viaport p from the charging port list P.

In step S13, the route setting unit 204 requests a parent node of the selected viaport p. The parent node is the departure point, or the charging port 30 to be stopped over immediately before the selected viaport p.

After step S13, the process returns to step S5 in FIG. 4, and the subsequent processes are repeated. That is, in the second and subsequent steps S5 to S13, the reachable range F from the installation position of the selected viaport p is set, and the next viaport p is selected from the available charging ports 30 that are installed within the reachable range F.

In a case where it is determined in step S6 that the destination is within the reachable range F while steps S5 to S13 are repeated, the process proceeds to step S14, and the route setting unit 204 requests a parent node of the destination.

In step S15, the route setting unit 204 sets the flight route by sequentially going back the parent node that have been requested so far and confirming the viaport p. In addition, the route setting unit 204 makes a reservation application for the confirmed viaport p.

Figure 6:
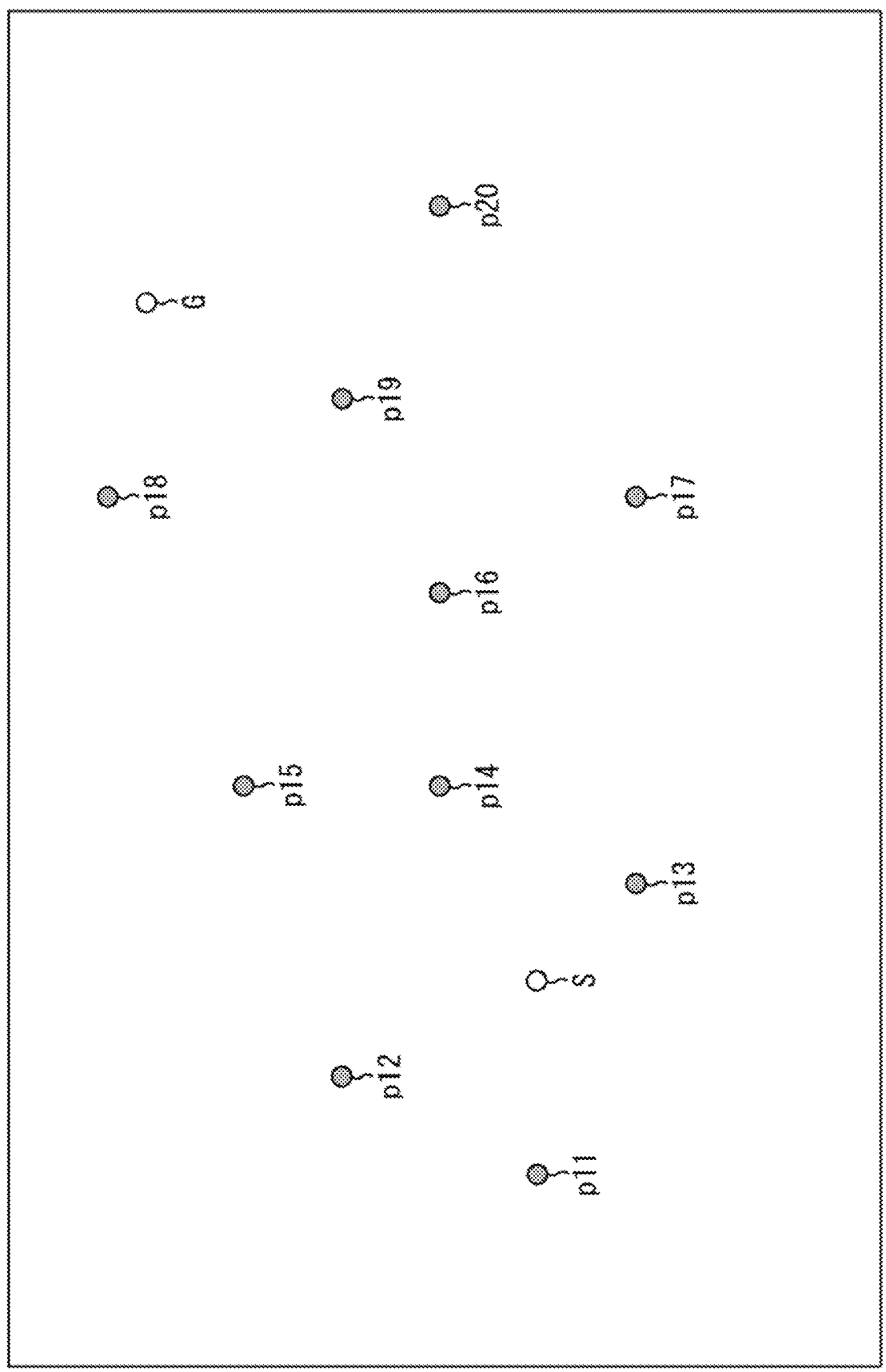
FIG. 6 is a diagram for explaining selection of a viaport.
Figure 7:
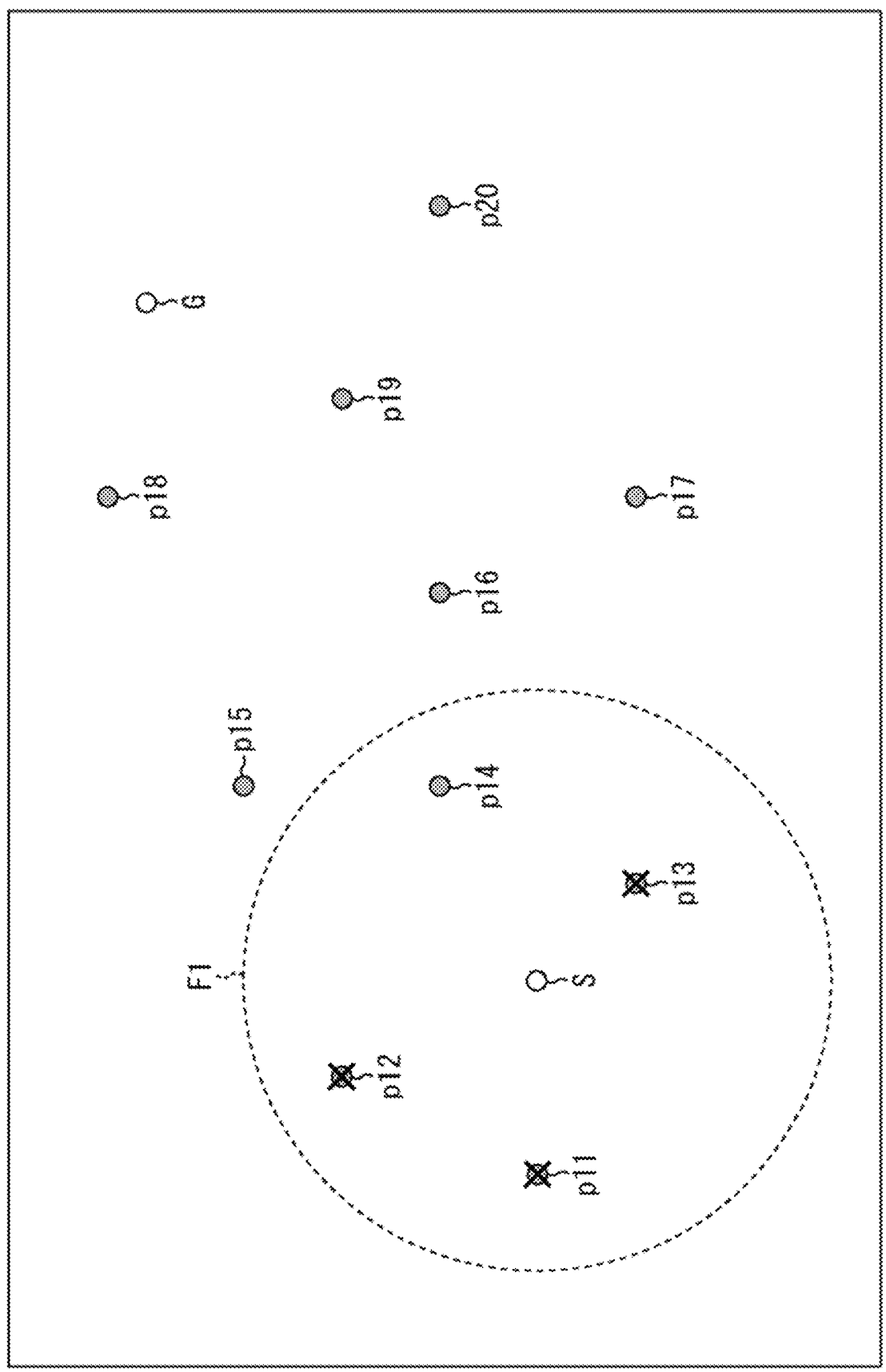
FIG. 7 is a diagram for explaining selection of a viaport.

For example, as illustrated in FIG. 6, in a case where the charging ports p11 to p20 are installed between the departure point S and the destination G and surroundings thereof, first, as illustrated in FIG. 7, the reachable range F1 centered on the departure point S is set.

Thereafter, the viaport is selected from among the available charging ports that are installed in the reachable range F1. In the example of FIG. 7, among the charging ports p11 to p14, the charging port p14 most suitable for the determination criterion desired by the user represented by the priority information is selected as the viaport. The departure point S is set as the parent node.

Figure 8:
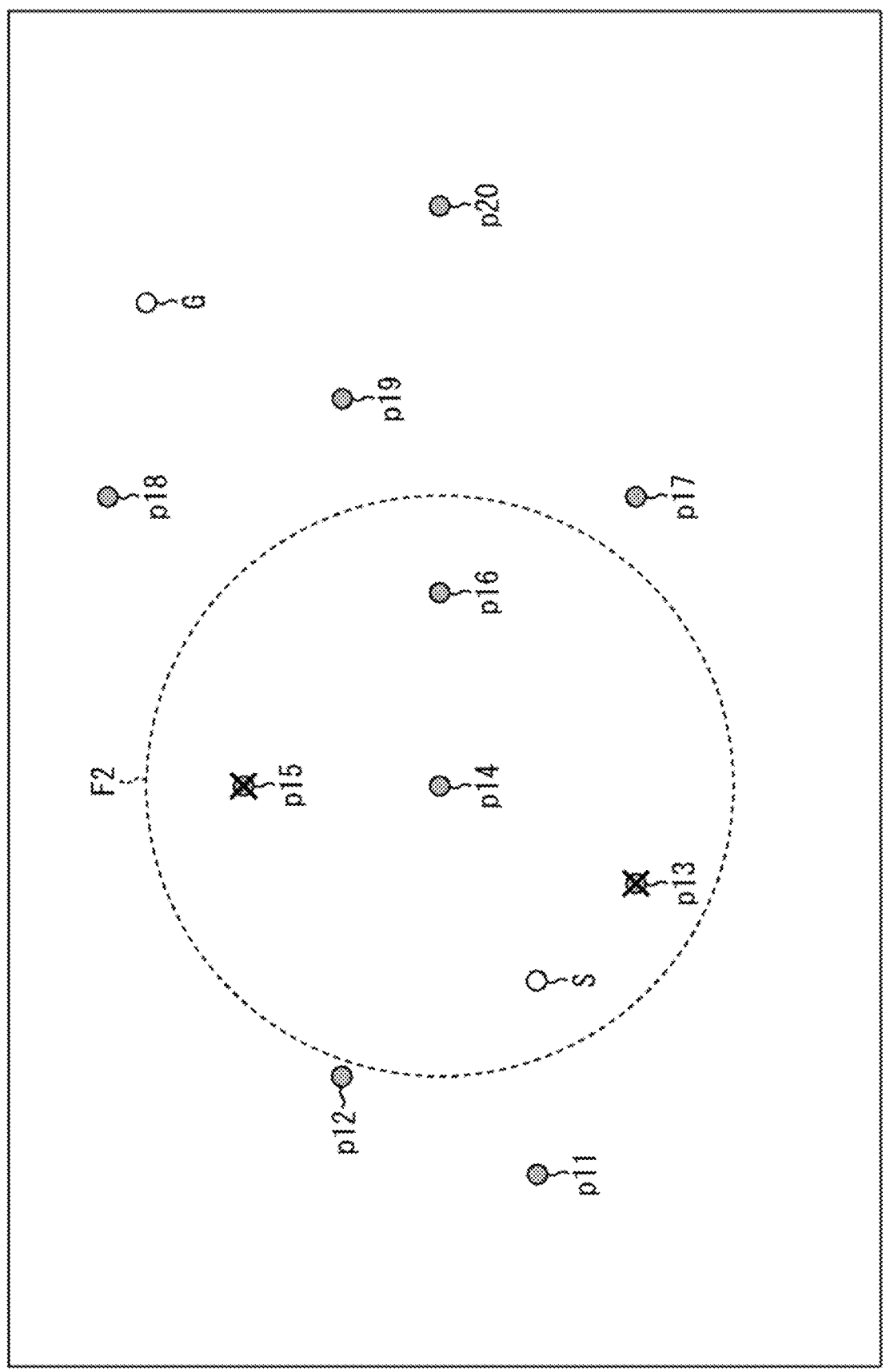

Next, as illustrated in FIG. 8, a reachable range F2 centered on the charging port p14 is set.

Thereafter, the viaport is selected from among the available charging ports that are installed in the reachable range F2. In the example of FIG. 8, among the charging ports p13, p15, and p16, the charging port p16 most suitable for the determination criterion desired by the user represented by the priority information is selected as the viaport. The charging port p14 is set as the parent node.

Figure 9:
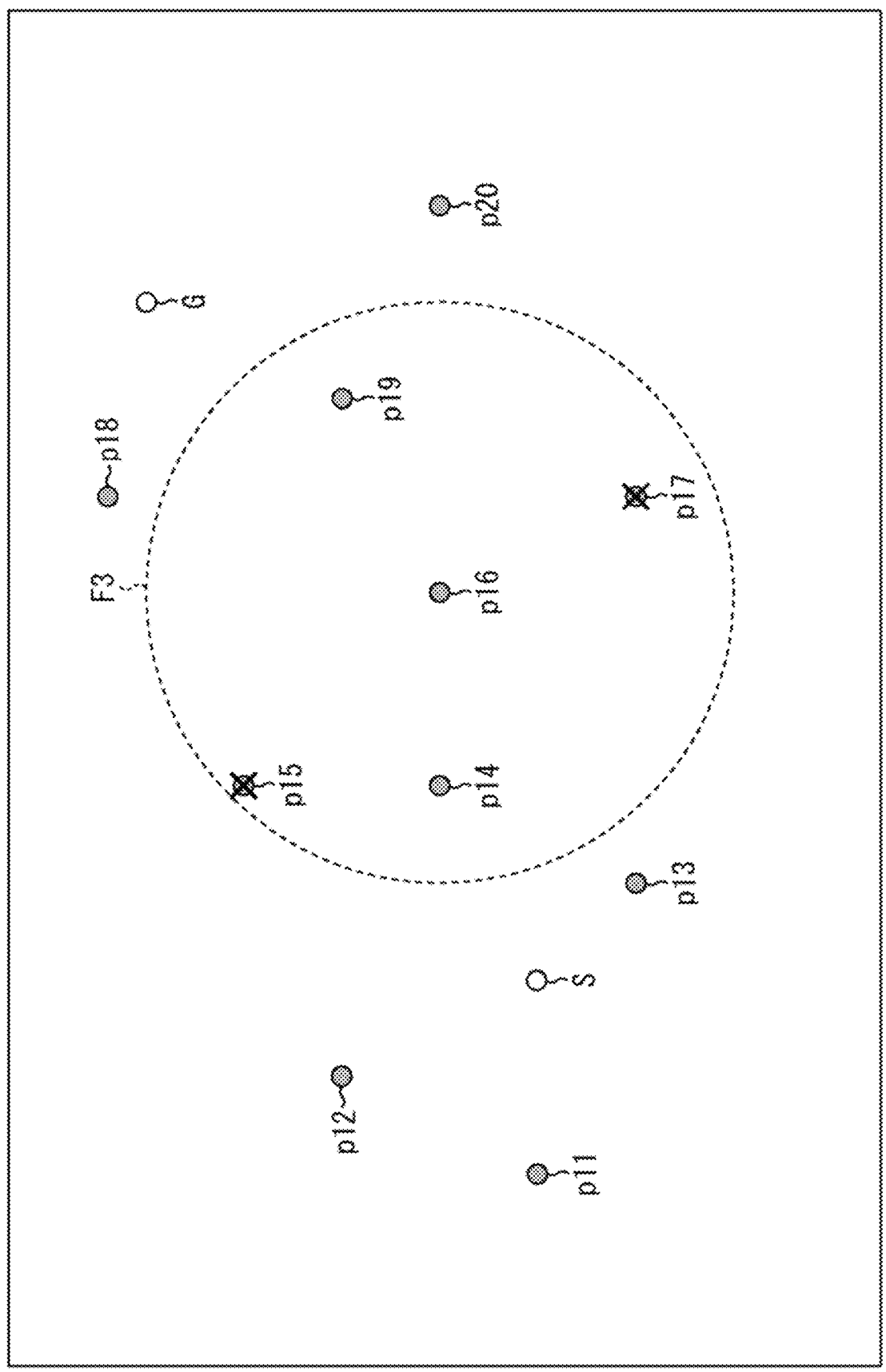
FIG. 9 is a diagram for explaining selection of a viaport.

Further, as illustrated in FIG. 9, a reachable range F3 centered on the charging port p16 is set.

Thereafter, the viaport is selected from among the available charging ports that are installed in the reachable range F3. In the example of FIG. 9, among the charging ports p15, p17, and p19, the charging port p19 most suitable for the determination criterion desired by the user represented by the priority information is selected as the viaport. The charging port p16 is set as the parent node.

Figure 10:
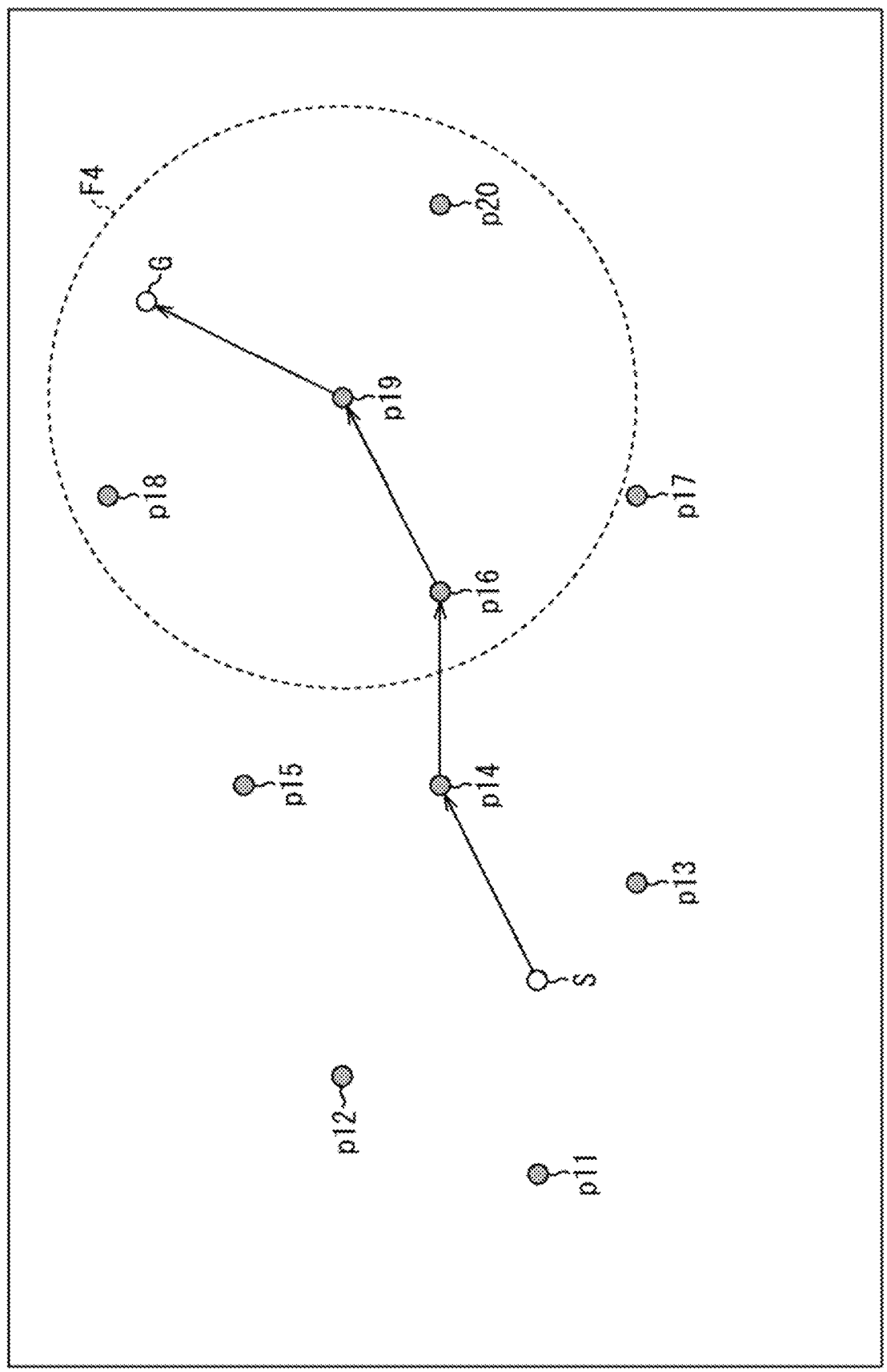
FIG. 10 is a diagram for explaining selection of a viaport.

Then, as illustrated in FIG. 10, a reachable range F4 centered on the charging port p19 is set. In the example of FIG. 10, since the destination G is within the reachable range F4, the charging port p19 is set as the parent node.

As a result, a flight route from the departure point S to the destination G is set by going back to the charging ports p19, p16, and p14 set as the parent node.

Returning to the flowchart of FIG. 5, in step S16, the route setting unit 204 outputs the route information 190 including information indicating the set flight route, the selected viaport, the estimated time of arrival to the destination, and the like. The output route information 190 is transmitted to the user terminal 10 and the drone 40. The flight route, the viaport, and the estimated time of arrival to the destination are presented on the user terminal 10 on the basis of the route information 190.

If it is determined in step S3 that the flight route cannot be set under the present status, if it is determined in step S8 that the charging port list P is an empty list, or if it is determined in step S10 that there is no available charging port 30 that can be reserved, the process proceeds to step S17.

In step S17, the route planning unit 100 outputs an error notification indicating that the flight route has not been set and the flight route has not been able to be set. The output error notification is transmitted to the user terminal 10 or the drone 40. An error notification is presented to the user terminal 10.

According to the above processing, since the flight route is set by selecting the viaport from among the plurality of charging ports on the basis of the priority information regarding the setting of the flight route, the user can more easily realize the route planning most suitable for the determination criterion desired by the user.

In addition, since the drone 40 can stop over at the charging port, it is possible to reliably fly to the destination without crash or the like on the way due to battery shortage while expanding the flight range.

Note that the above-described route planning process is executed before the flight of the drone 40, but can be executed during the flight of the drone 40 by treating the current position of the drone 40 during flight as a departure point. In a case where the route planning process is executed during the flight of the drone 40, the route planning process may be repeated at regular time intervals, or may be executed every time the weather information or the traffic information is updated.

4. Specific Example of Viaport Selection

As described above, the charging port 30 most suitable for the determination criterion represented by the priority information is selected as the viaport p from among the available charging ports 30 that are installed within the reachable range F.

The user can determine which one of the cost, the required time, the distance, the flight efficiency, the safety, and the like is prioritized to select the viaport, and therefore can determine which one is prioritized to set the flight route according to the priority information.

Hereinafter, in the setting of the flight route, an example of selecting a viaport by prioritizing the cost required for charging to the destination and an example of selecting a viaport by prioritizing the time required to reach the destination will be specifically described.

(Example of Case of Prioritizing Cost)

Figure 11:
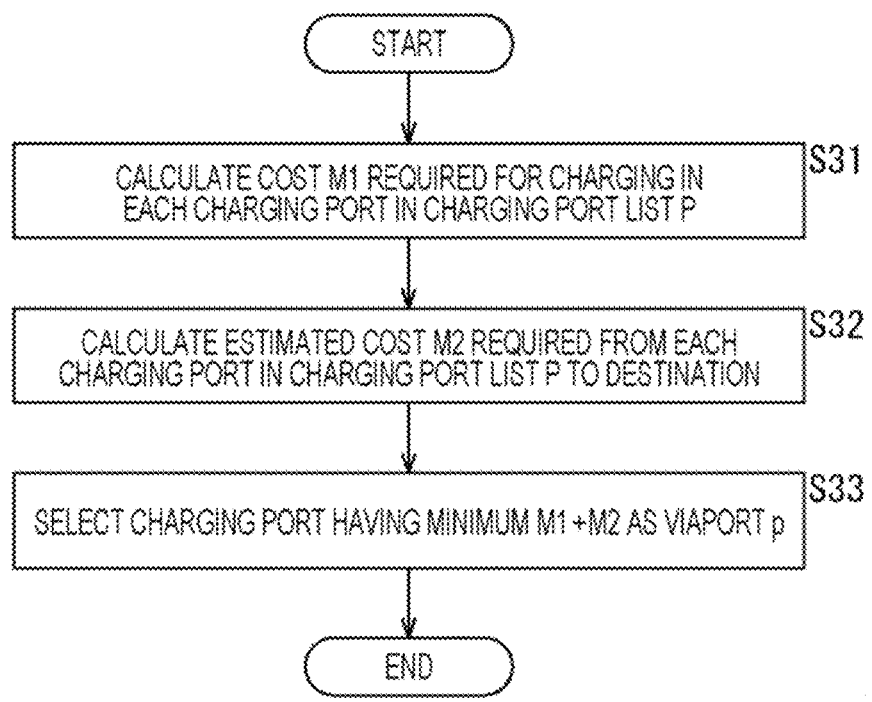
FIG. 11 is a flowchart for explaining a process of selection processing of a viaport.

First, with reference to the flowchart of FIG. 11, process of the viaport selection processing in a case where the cost for charging to the destination is prioritized in the setting of the flight route will be described. The processing in FIG. 11 is executed in step S11 of the flowchart in FIG. 5 described above.

In step S31, the viaport selection unit 203 calculates the cost M1 required for charging in each charging port 30 in the charging port list P. The cost M1 is calculated on the basis of the cost for charging per unit time included in the port information 180 and the charge capacity of the battery held in the aircraft DB 110.

In step S32, the viaport selection unit 203 calculates the estimated cost M2 required from each charging port 30 in the charging port list P to the destination. For example, the estimated cost M2 is calculated on the basis of a history of flight on a similar flight route on the basis of a past aviation database. In addition, the estimated cost M2 may be calculated as a virtual cost required in a case where the charging port 30 charges a charging amount required for flying from each charging port 30 to the destination at a direct distance.

In step S33, the viaport selection unit 203 selects the charging port 30 having the minimum M1+M2 as the viaport p.

In this manner, the viaport is selected with priority given to the cost required for charging to the destination.

Note that, in the above-described processing, it is basically assumed that the battery is fully charged. However, in a case where the distance from each charging port 30 to the next charging port 30 or the destination is short, or in a case where the charging time is limited depending on the reservation situation, it is not essential that the battery is fully charged, and the cost required for charging or the time may be reduced.

(Example of Case of Prioritizing Required Time)

Figure 12:
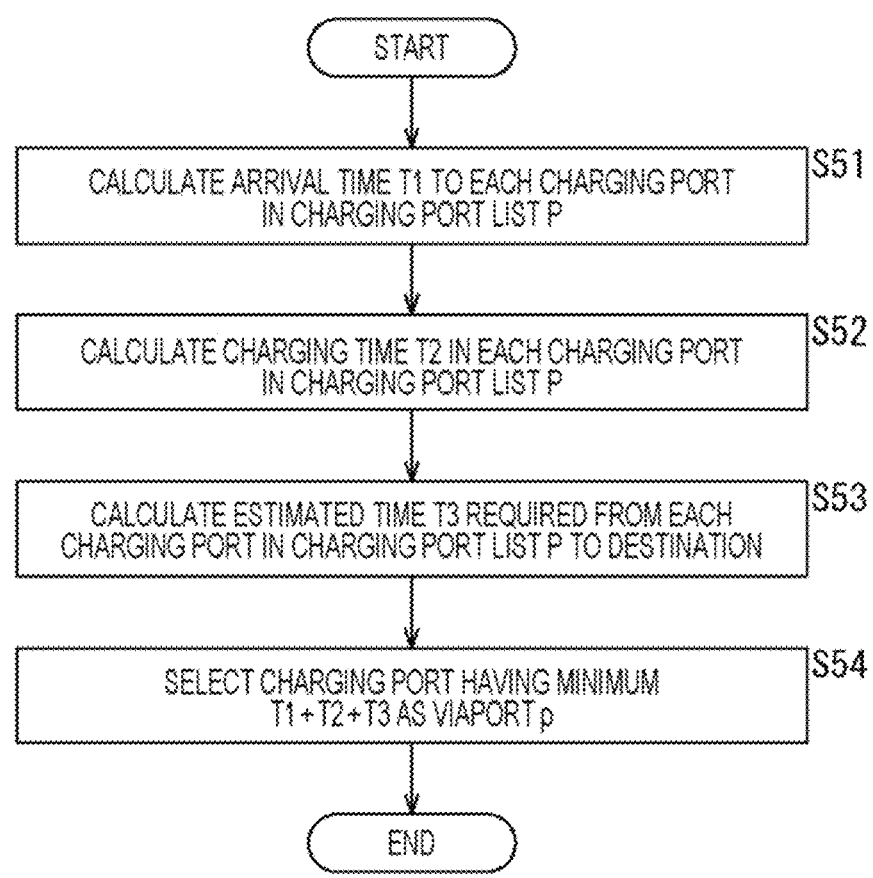
FIG. 12 is a flowchart for explaining a process of selection processing of a viaport.

Next, with reference to the flowchart of FIG. 12, process of the viaport selection processing in a case where the time required to the destination is prioritized in the setting of the flight route will be described. The processing in FIG. 12 is also executed in step S11 of the flowchart in FIG. 5 described above.

In step S51, the viaport selection unit 203 calculates arrival time T1 to each charging port 30 in the charging port list P. The arrival time T1 is calculated on the basis of, for example, the direct distance to each charging port 30 and the maximum speed held in the aircraft DB 110.

In step S52, the viaport selection unit 203 calculates charging time T2 in each charging port 30 in the charging port list P. The charging time T2 is calculated, for example, on the basis of the charging specifications included in the port information 180 and the charge capacity of the battery held in the aircraft DB 110.

In step S53, the viaport selection unit 203 calculates the estimated time T3 required from each charging port 30 in the charging port list P to the destination. For example, the estimated time T3 is calculated on the basis of a history of flight on a similar flight route on the basis of a past aviation database. Furthermore, the estimated time T3 may be calculated as a time required in a case of flying from each of the charging ports 30 to the destination at a direct distance.

In step S54, the viaport selection unit 203 selects the charging port 30 having the minimum T1+T2+T3 as the viaport p.

In this manner, the viaport is selected with priority given to the time required to the destination.

Note that, in the above-described processing, it is basically assumed that the battery is fully charged. However, in a case where the distance from each charging port 30 to the next charging port 30 or the destination is short, or in a case where the charging time is limited depending on the reservation situation, the battery does not need to be fully charged, and the time required may be reduced.

The example in which the technology according to the present disclosure is applied to the UTM that controls the flight of the drone that is a flight vehicle has been described above. However, the technology according to the present disclosure is not limited to a drone, and can also be applied to an information processing apparatus that sets a moving route from a departure point to a destination of a moving object including an autonomous mobile vehicle, a ship, an autonomous mobile robot such as or a vacuum cleaner.

<5. Configuration Example of Computer>

A series of processing described above can be executed by hardware or software. If the series of processing is executed by software, a program constituting the software is installed in a computer. Here, the computer includes a computer incorporated in dedicated hardware, a general-purpose personal computer capable of executing various functions by installing various programs, and the like, for example.

Figure 13:
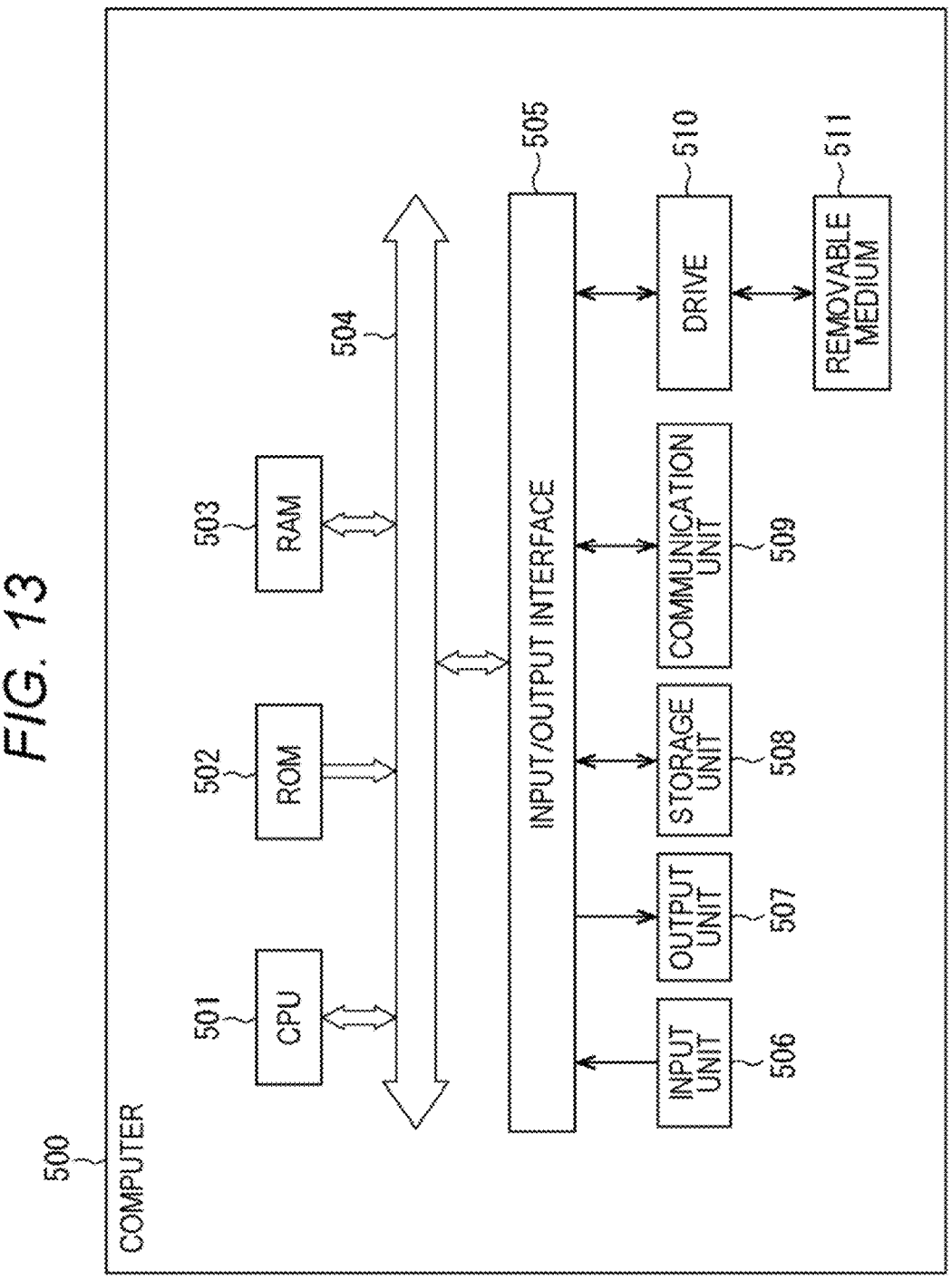
FIG. 13 is a block diagram illustrating a configuration example of a computer.

FIG. 13 is a block diagram illustrating an exemplary hardware configuration of a computer that executes the series of processing described above by a program.

In the computer, a CPU 501, a read only memory (ROM) 502, and a random access memory (RAM) 503 are connected to one another by a bus 504.

An input/output interface 505 is further connected to the bus 504. An input unit 506, an output unit 507, a storage unit 508, a communication unit 509, and a drive 510 are connected to the input/output interface 505.

The input unit 506 includes a keyboard, a mouse, a microphone, or the like. The output unit 507 includes a display, a speaker, or the like. The storage unit 508 includes a hard disk, a nonvolatile memory, or the like. The communication unit 509 includes a network interface or the like. The drive 510 drives a removable medium 511 such as a magnetic disk, an optical disk, a magneto-optical disk, or a semiconductor memory.

In the computer configured as described above, the CPU 501 loads a program that is recorded, for example, in the storage unit 508 onto the RAM 503 via the input/output interface 505 and the bus 504, and executes the program. Thus, the above-described series of processing is performed.

Programs to be executed by the computer (the CPU 501) are provided being recorded in the removable medium 511 which is a packaged medium or the like, for example. Also, programs may be provided via a wired or wireless transmission medium, such as a local area network, the Internet or digital satellite broadcasting.

In the computer, the program can be installed on the storage unit 508 via the input/output interface 505 by mounting the removable medium 511 on the drive 510. In addition, the program can be received by the communication unit 509 via a wired or wireless transmission medium and can be installed on the storage unit 508. Additionally, the program can be installed in advance on the ROM 502 or the storage unit 508.

Note that the program executed by the computer may be a program in which processing is performed in time series in the order described in the present specification, or may be a program in which processing is performed in parallel or at necessary timing such as when a call is made.

Embodiments of the present disclosure are not limited to the above embodiment, and various kinds of modification can be performed within the scope of the present disclosure.

The effects described in the present specification are merely examples and are not limited, and other effects may be provided.

Additionally, the present disclosure may also be configured as below.

(1)

An information processing apparatus including:

a route planning unit that sets a moving route from a departure point to a destination of a moving object, in which the route planning unit selects, on the basis of priority information regarding setting of the moving route, a viaport where the moving object stops over in the moving route from among a plurality of charging ports that charges the moving object.

(2)

The information processing apparatus according to (1), in which the priority information indicates that a cost required for charging to the destination is prioritized in setting the moving route, and the route planning unit selects the viaport with the lowest cost from among the plurality of charging ports.

(3)

The information processing apparatus according to (1), in which the priority information indicates that required time to the destination is prioritized in setting the moving route, and the route planning unit selects the viaport with the shortest required time from among the plurality of charging ports.

(4)

The information processing apparatus according to (3), in which the route planning unit selects the viaport on the basis of charging time at each of the plurality of charging ports.

(5)

The information processing apparatus according to (3), in which the route planning unit selects the viaport; on the basis of arriving time at each of the plurality of charging ports.

(6)

The information processing apparatus according to any one of (1) to (5), in which the route planning unit selects the viaport on the basis of the priority information input, by a user, (7)

The information processing apparatus according to any one of (1) to (6), in which the route planning unit sets a reachable range from a predetermined position of the moving object, and selects the viaport from among the charging ports installed in the reachable range.

(8)

The information processing apparatus according to (7), in which the route planning unit sets the reachable range on the basis of at least one of a remaining battery level and power consumption of the moving object.

(9)

The information processing apparatus according to (7) or (8), in which
the predetermined position is the departure point or an installation position of the viaport to be stopped over immediately before.

(10)

The information processing apparatus according to according to any one of (7) to (9), in which
the route planning unit selects the viaport from among the charging ports designated by designation information input by a user among the charging ports installed in the reachable range.

(11)

The information processing apparatus according to any one of (1) to (10), in which
the route planning unit starts, on the basis of arrival and departure information input by a user, setting the moving route.

(12)

The information processing apparatus according to (11), in which
the arrival and departure information includes position information of the departure point and the destination, and a departure time.

(13)

The information processing apparatus according to any one of (1) to (12), in which
the route planning unit presents the set moving route to a user terminal.

(14)

The information processing apparatus according to (13), in which
the route planning unit presents estimated arrival time at the destination together with the moving route to the user terminal.

(15)

The information processing apparatus according to any one of (1) to (12), in which
the route planning unit outputs the set moving route to the moving object.

(16)

The information processing apparatus according to any one of (1) to (15), in which
the route planning unit does not set the moving route in a case where it is determined that the moving object cannot move on the basis of weather information.

(17)

The information processing apparatus according to any one of (1) to (15), in which
the route planning unit does net set the moving route in a case where it is determined that the moving object cannot move on the basis of traffic information.

(18)

An information processing method including:
by an information processing apparatus that sets a moving route from a departure point to a destination of a moving object,
selecting, on the basis of priority information regarding setting of the moving route, a viaport where the moving object stops over in the moving route from among a plurality of charging ports that charges the moving object.

(19)

A program for causing
a computer to execute:
selecting, on the basis of priority information regarding setting of a moving route from a departure point to a destination of a moving object, a viaport where the moving object stops over in the moving route from among a plurality of charging ports that charges the moving object.

(20)

An information processing system including:
an information processing apparatus that sets a moving route of a moving object from a departure point to a destination; and
a plurality of charging ports that charges the moving object, in which
the information processing apparatus
selects, on the basis of priority information regarding setting of the moving route, a viaport where the moving object stops over in the moving route from among the plurality of charging ports.

REFERENCE SIGNS LIST

10 User terminal
20 UTM
30 Charging port
40 Drone
100 Route planning unit
201 Flight availability determination unit
202 Reachable range setting unit
203 Viaport selection unit
204 Route setting unit

The invention claimed is:

1. An information processing apparatus comprising:
circuitry configured to
  acquire information of a departure point and a destination of a moving object,
  acquire priority information regarding setting of a moving route from the departure point to the destination of the moving object,
  acquire information of a remaining battery level of the moving object,
  set a reachable range of the moving object from the departure point, based on the remaining battery level,
  determine whether the destination is within the reachable range,
  determine a set of charging ports that are located within the reachable range and available for charging the moving object under a condition that it is determined that the destination is not within the reachable range, and
  select, based on the priority information, a viaport where the moving object stops over in the moving route from the set of charging ports, wherein the circuitry is further configured to
  set an updated reachable range of the moving object from the viaport that was lastly selected,
  determine whether the destination is within the updated reachable range,
  determine an updated set of charging ports that are located within the updated reachable range and available for charging the moving object under a condition that it is determined that the destination is not within the updated reachable range,
  select, based on the priority information, an additional viaport where the moving object subsequently stops over in the moving route from the updated set of charging ports, repeat setting the updated reachable range of the moving object, determining whether the destination is within the updated reachable range, and determining the updated set of charging ports until it is determined that the destination is within the updated reachable range, and set the moving route from the departure point to the destination of the moving object via the viaport and the additional viaport or viaports under a condition that it is determined that the destination is within the updated reachable range that was lastly set.

2. The information processing apparatus according to claim 1, wherein the priority information indicates that a cost required for charging to the destination is prioritized in setting the moving route, and the circuitry is further configured to select the viaport and the additional viaport or viaports with the lowest cost from the set of charging ports and the updated set of charging ports.

3. The information processing apparatus according to claim 1, wherein the priority information indicates that required time to the destination is prioritized in setting the moving route, and the circuitry is further configured to select the viaport and the additional viaport or viaports with the shortest required time from the set of charging ports and the updated set of charging ports.

4. The information processing apparatus according to claim 3, wherein the circuitry is further configured to select the viaport and the additional viaport or viaports on a basis of charging time at each charging port of the set of charging ports and the updated set of charging ports.

5. The information processing apparatus according to claim 3, wherein the circuitry is further configured to select the viaport and the additional viaport or viaports on a basis of arriving time at each charging port of the set of charging ports and the updated set of charging ports.

6. The information processing apparatus according to claim 1, wherein the circuitry is further configured to select the viaport and the additional viaport or viaports on a basis of the priority information input by a user.

7. The information processing apparatus according to claim 1, wherein the circuitry is further configured to select the viaport and the additional viaport or viaports from among certain charging ports that are designated by designation information input by a user.

8. The information processing apparatus according to claim 1, wherein the circuitry is further configured to start setting the moving route based on position information of the departure point and the destination, and a departure time.

9. The information processing apparatus according to claim 1, wherein the circuitry is further configured to present the moving route to a user terminal.

10. The information processing apparatus according to claim 9, wherein the circuitry is further configured to present an estimated arrival time at the destination together with the moving route to the user terminal.

11. The information processing apparatus according to claim 1, wherein the circuitry is further configured to output the moving route to the moving object.

12. The information processing apparatus according to claim 1, wherein the circuitry is further configured to not set the moving route in a case where it is determined that the moving object cannot move on a basis of weather information.

13. The information processing apparatus according to claim 1, wherein the circuitry is further configured to not set the moving route in a case where it is determined that the moving object cannot move on a basis of traffic information.

14. An information processing method executed by an information processing apparatus, the method comprising:

acquiring information of a departure point and a destination of a moving object, acquiring priority information regarding setting of a moving route from the departure point to the destination of the moving object, acquiring information of a remaining battery level of the moving object, setting a reachable range of the moving object from the departure point, based on the remaining battery level, determining whether the destination is within the reachable range, determining a set of charging ports that are located within the reachable range and available for charging the moving object under a condition that it is determined that the destination is not within the reachable range, and selecting, on a basis of the priority information, a viaport where the moving object stops over in the moving route from the set of charging ports, wherein the method further comprises setting an updated reachable range of the moving object from the viaport that was lastly selected, determining whether the destination is within the updated reachable range, determining an updated set of charging ports that are located within the updated reachable range and available for charging the moving object under a condition that it is determined that the destination is not within the updated reachable range, selecting, based on the priority information, an additional viaport where the moving object subsequently stops over in the moving route from the updated set of charging ports, repeating setting the updated reachable range of the moving object, determining whether the destination is within the updated reachable range, and determining the updated set of charging ports until it is determined that the destination is within the updated reachable range, and setting the moving route from the departure point to the destination of the moving object via the viaport and the additional viaport or viaports under a condition that it is determined that the destination is within the updated reachable range that was lastly set.

15. A non-transitory computer-readable storage medium storing a program for causing a computer to execute a process, the process comprising:

acquiring information of a departure point and a destination of a moving object, acquiring priority information regarding setting of a moving route from the departure point to the destination of the moving object, acquiring information of a remaining battery level of the moving object, setting a reachable range of the moving object from the departure point, based on the remaining battery level, determining whether the destination is within the reachable range, determining a set of charging ports that are located within the reachable range and available for charging the moving object under a condition that it is determined that the destination is not within the reachable range, and selecting, on a basis of the priority information, a viaport where the moving object stops over in the moving route from the set of charging ports, wherein the process further comprises setting an updated reachable range of the moving object from the viaport that was lastly selected, determining whether the destination is within the updated reachable range, determining an updated set of charging ports that are located within the updated reachable range and available for charging the moving object under a condition that it is determined that the destination is not within the updated reachable range, selecting, based on the priority information, an additional viaport where the moving object subsequently stops over in the moving route from the updated set of charging ports, repeating setting the updated reachable range of the moving object, determining whether the destination is within the updated reachable range, and determining the updated set of charging ports until it is determined that the destination is within the updated reachable range, and setting the moving route from the departure point to the destination of the moving object via the viaport and the additional viaport or viaports under a condition that it is determined that the destination is within the updated reachable range that was lastly set.

16. An information processing system comprising:

an information processing apparatus that sets a moving route of a moving object from a departure point to a destination; and a plurality of charging ports that is capable of charging the moving object, wherein the information processing apparatus has circuitry configured to acquire information of the departure point and the destination of the moving object, acquire priority information regarding setting of the moving route from the departure point to the destination of the moving object, acquire information of a remaining battery level of the moving object, set a reachable range of the moving object from the departure point, based on the remaining battery level, determine whether the destination is within the reachable range, determine, from the plurality of charging ports, a set of charging ports that are located within the reachable range and available for charging the moving object under a condition that it is determined that the destination is not within the reachable range and selects, on a basis of the priority information and from the set of charging ports, a viaport where the moving object stops over in the moving route, wherein the circuitry of the information processing apparatus is further configured to set an updated reachable range of the moving object from the viaport that was lastly selected, determine whether the destination is within the updated reachable range, determine, from the plurality of charging ports, an updated set of charging ports that are located within the updated reachable range and available for charging the moving object under a condition that it is determined that the destination is not within the updated reachable range, select, based on the priority information and from the updated set of charging ports, an additional viaport where the moving object subsequently stops over in the moving route, repeat setting the updated reachable range of the moving object, determining whether the destination is within the updated reachable range, and determining the updated set of charging ports until it is determined that the destination is within the updated reachable range, and set the moving route from the departure point to the destination of the moving object via the viaport and the additional viaport or viaports under a condition that it is determined that the destination is within the updated reachable range that was lastly set.

* * * * *